(12) United States Patent
Zeng et al.

(10) Patent No.: US 11,132,028 B2
(45) Date of Patent: Sep. 28, 2021

(54) FLEXIBLE DISPLAY DEVICE WITH A FIXING ROD

(71) Applicant: Wuhan Tianma Micro-Electronics Co., Ltd., Wuhan (CN)

(72) Inventors: Jie Zeng, Wuhan (CN); Jiang Chen, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 26 days.

(21) Appl. No.: 16/685,216

(22) Filed: Nov. 15, 2019

(65) Prior Publication Data

US 2020/0409417 A1 Dec. 31, 2020

(30) Foreign Application Priority Data

Jun. 25, 2019 (CN) .......................... 201910557221.1

(51) Int. Cl.
*G06F 1/16* (2006.01)

(52) U.S. Cl.
CPC ............ *G06F 1/1652* (2013.01); *G06F 1/166* (2013.01)

(58) Field of Classification Search
CPC ........ G06F 1/1652; G06F 1/166; G09F 9/301; H04M 1/0268; F16M 13/00
See application file for complete search history.

(56) References Cited

U.S. PATENT DOCUMENTS

2008/0151480 A1* 6/2008 Chung ................. G06F 1/1652
361/679.06
2013/0201638 A1 8/2013 Kim

FOREIGN PATENT DOCUMENTS

| CN | 107705707 A | 2/2018 |
|---|---|---|
| CN | 207529588 U | 6/2018 |
| CN | 108447402 A | 8/2018 |

OTHER PUBLICATIONS

Chinese Office Action for application No. 201910557221.1; dated Dec. 3, 2020.

* cited by examiner

*Primary Examiner* — James Wu
(74) *Attorney, Agent, or Firm* — von Briesen & Roper, s.c.

(57) ABSTRACT

Provided is a flexible display device. The flexible display device includes a flexible screen and a fixing rod. The fixing rod is connected to the flexible screen through a rotating device. The fixing rod has a first end and a second end. The fixing rod is capable of rotating to such position that the fixing rod is parallel to an expansion direction of the flexible screen and the second end of the fixing rod is detachably connected to the flexible screen. With the rotating device, the fixing rod of the flexible display device can be switched between a fixing state and a non-fixing state. In the fixing state, the flexible screen is fixed by the fixing rod to prevent deforming of the flexible screen.

14 Claims, 11 Drawing Sheets

FLEXIBLE DISPLAY DEVICE WITH A FIXING ROD

CROSS-REFERENCES TO RELATED APPLICATIONS

This application claims priority to Chinese patent application No. 201910557221.1 filed on Jun. 25, 2019, the content of which is incorporated herein by reference in its entirety.

TECHNICAL FIELD

The present disclosure relates to the field of display technology, and in particular to a flexible display device.

BACKGROUND

In recent years, display devices have become lighter, thinner and flexible. A flexible screen is increasingly applied to a portable display device due to the variability of its screen form. Therefore, the energy consumption of the display device is reduced while the volume of the portable display device is reduced.

When the flexible display screen is not in use, the flexible display screen is usually stored in a wound state, a folded state, etc. to reduce the volume. When the flexible display screen is in use, the flexible display screen is unwound or unfolded, so that images may be displayed in a larger area. However, because the flexible display screen is stored in a wound state or a folded state, the area for displaying images deforms after the flexible display screen is unwound or unfolded, thereby causing a poor visual experience for the user.

Therefore, it is desirable to provide a flexible display device to solve the above problems.

SUMMARY

The present disclosure provides a flexible display device in which a unfolded or unwound flexible screen is stably fixed and supported so as to avoid the image deformation caused by deforming of the flexible screen.

A flexible display device includes: a flexible screen, and a fixing rod.

The fixing rod is connected to the flexible screen through a rotating device. The fixing rod has a first end and a second end. The fixing rod is capable of rotating to such a position that the fixing rod is parallel to an expansion direction of the flexible screen and the second end of the fixing rod is detachably connected to the flexible screen.

Figure 1:
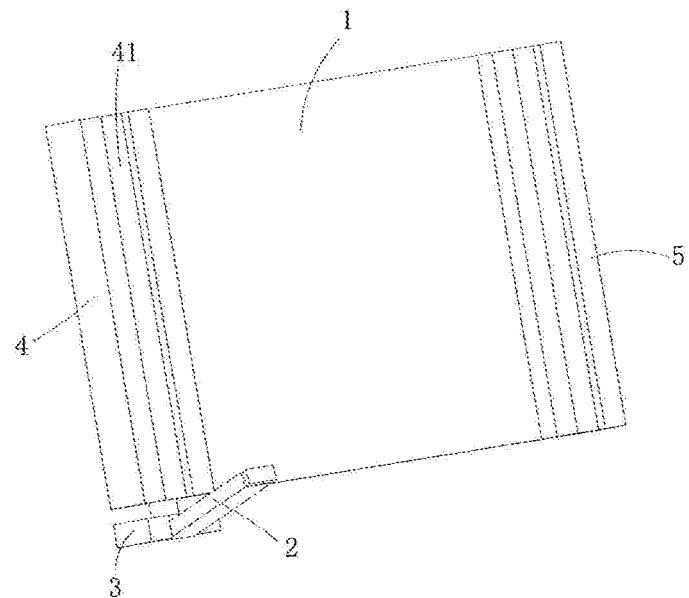
FIG. 1 is a schematic view of a first flexible display device provided by an embodiment of the present disclosure.

The reference numerals in the drawings are as follows:
1—flexible screen;
2—fixing rod; 21—second pivot shaft; 22—abutting part; 23—sub-rod; 24—threaded adjusting rod; 25—tapered channel;
3—rotating block; 31—first pivot shaft; 32—recess;
4—first storage member; 41 receiving groove; 42 winding shaft; 43—housing; 44—opening;
5—second storage member.

DETAILED DESCRIPTION

The present disclosure will be further described in detail below in conjunction with the accompanying drawings and embodiments. It is to be understood that the specific embodiments described herein are merely illustrative of the present disclosure and are not intended to limit the present disclosure. It should also be noted that, for ease of description, only some, but not all, of the structures related to the present disclosure are shown in the drawings.

In the description of the present disclosure, unless expressly specified or limited otherwise, the terms "coupled", "connected", and "fixed" are to be construed broadly, for example may mean fixedly connected, detachably connected, or integrated; may mean mechanically connected or electrically connected; may mean directly connected, indirectly connected through an intermediate medium, or may mean inside connection of two elements or the interaction between two elements. The specific meanings of the above terms in the present disclosure may be understood according to the specific circumstances by those of ordinary skill in the art.

In the present disclosure, unless expressly specified or limited otherwise, a first feature being "on" or "under" a second feature may include the first and second features being in direct contact, or may include the first and second features not being in direct contact but being in contact with each other through additional features therebetween. Moreover, the first feature being "on", "above" and "over" the second feature includes the first feature being directly above and obliquely above the second feature, or simply indicates that the first feature is at a higher level than the second feature. The first feature being "under", "below" and "beneath" the second feature includes the first feature being directly below and obliquely below the second feature, or simply represents that the first feature is at a lower level than the second feature.

In the description of the technical solutions provided by the embodiments of the present disclosure, orientations or positional relationships of the terms "upper", "lower", "right", etc. are based on the orientations or positional relationships shown in the drawings, and are merely for convenience of description and simplification of operations, and do not indicate or imply that the devices or elements referred to must have a particular orientation, be constructed and operated in a particular orientation, and thus should not be construed as limiting the present disclosure. Furthermore, the terms "first" and "second" are used merely to distinguish between descriptions and have no special meaning.

Figure 2:
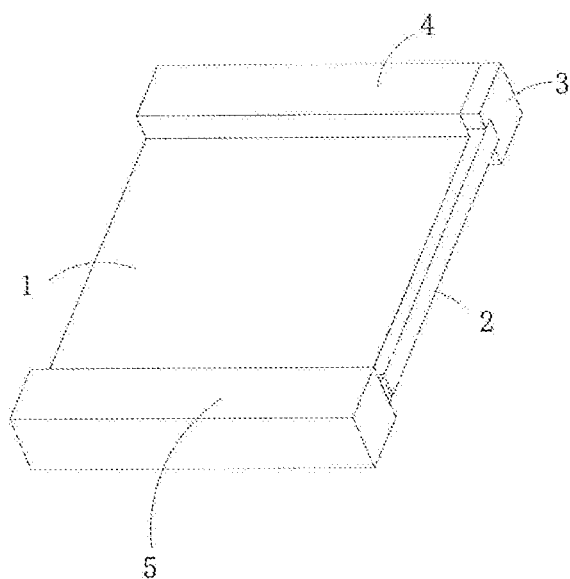
FIG. 2 is a schematic view of the first flexible display device in which a fixing rod supports an expanded flexible screen provided by an embodiment of the present disclosure.

The present disclosure provides a flexible display device. FIG. 1 is a schematic view of a first flexible display device provided by an embodiment of the present disclosure, and FIG. 2 is a schematic view of the first flexible display device in which a fixing rod supports an expanded flexible screen in an embodiment of the present disclosure. As shown in FIGS. 1 and 2, the flexible display device includes a flexible screen 1, a storage member configured to accommodate the flexible screen 1, and a fixing rod 2 configured to support the flexible screen 1 when the flexible screen 1 is expanded. The flexible display device further includes a rotating device. In one or more embodiments, the flexible screen 1 is connected to the storage member, the rotating device is connected to the storage member and indirectly connected to the storage member through the storage member, and the fixing rod 2 is connected to the rotating device.

The flexible screen 1 may be wound around a rod in the storage member or folded in the storage member when the flexible screen 1 is not in use. When the flexible screen 1 is in use, the flexible screen 1 is expanded. The flexible screen 1 has a first end and a second end. The first end of the flexible screen 1 is connected to the storage member. The second end of the flexible screen 1 is also referred to as a free end.

The fixing rod 2 has a first end and a second end. The first end of the fixing rod 2 is secured to the rotating device, such that the fixing rod 2 rotates along with the rotation of the rotating device. The second end of the fixing rod 2 is also referred to as a free end.

When the flexible screen 1 is expanded, with the rotation of the rotating device, the fixing rod 2 rotates to a position where the fixing rod 2 is parallel to an expansion direction of the flexible screen 1. The free end of the fixing rod 2 and the free end of the flexible screen 1 are detachably connected, such that the expanded flexible screen 1 is selectively fixed by the fixing rod 2. In an exemplary embodiment, the free end of the flexible screen 1 is provided with a connecting part, the free end of the fixing rod 2 may be selectively abutted against the connecting part (as shown in FIG. 2). In an alternative embodiment, the free end of the flexible screen 1 is provided with a plug part, and the free end of the fixing rod 2 has an inserting groove, and the plug part is selectively inserted into the inserting groove. With the rotating device and the fixing rod 2, the flexible screen 1 in the expanded state can be fixed stably and the flexible screen 1 in the expanded state is flat, such that the unwound or unfolded flexible screen 1 has no curling, thereby improving the display effect and user experience. Furthermore, with the rotating device, the fixing rod 2 can fix the flexible screen 1 more conveniently.

Figure 3:
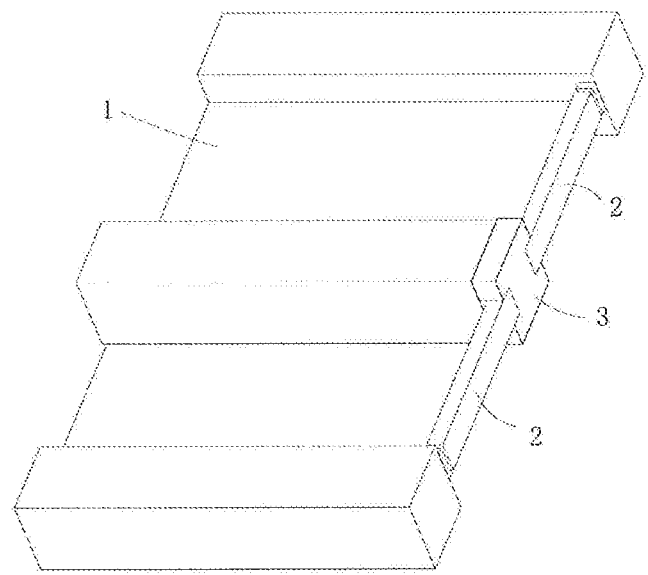
FIG. 3 is a schematic view of a second flexible display device provided by an embodiment of the present disclosure.

In one or more embodiments, a second flexible display device is provided. FIG. 3 is a schematic view of the second flexible display device. As shown in FIG. 3, the rotating device may be located at a middle position of the flexible screen 1 in the expansion direction of the flexible screen 1, and the second flexible display device includes two fixing rods 2 both connected to the rotating device. The first end of the fixing rod 2 is connected to the rotating device, and the second end of the fixing rod 2 may be detachably connected to the flexible screen 1. The flexible screen 1 is expanded in two opposite directions. The two fixing rods 2 may be rotated, such that their extending directions are parallel to the expansion direction of the flexible screen 1, and the second ends of the two fixing rods 2 are detachably connected to the free ends of the flexible screen 1 respectively. In this way, the flexible screen 1 in the expanded state is fixed.

Optionally, as shown in FIGS. 1 and 2, the rotating device is connected to the flexible screen 1, the rotating device may be connected to the fixing rod 2, the first end of the fixing rod 2 is connected to the rotating device, and the second end of the fixing rod 2 is detachably connected to the free end of the expanded flexible screen 1. In view of the above, the flexible screen 1 in the expanded state may be fixed by means of one or more fixing rods 2.

Figure 4:
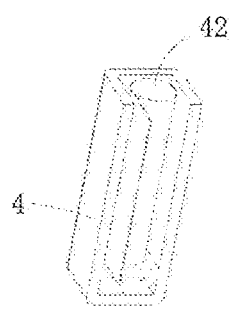
FIG. 4 is a schematic view of a storage member provided by an embodiment of the present disclosure.
Figure 5:
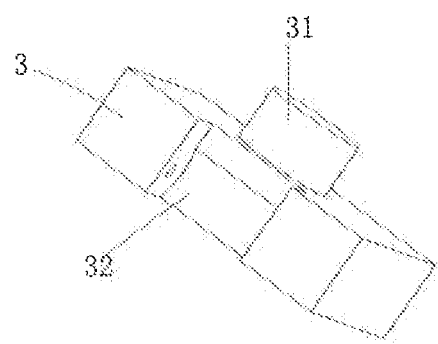
FIG. 5 is a schematic view of a rotating block provided by an embodiment of the present disclosure.

The storage member may include a variety of implementation manners. As shown in FIG. 4, the storage member includes a first storage member 4 which includes a winding shaft 42 connected to the flexible screen 1. The flexible screen 1 may be wound around the winding shaft of the first storage member 4, such that the flexible screen 1 is accommodated in the first storage member 4. The rotation axis of the rotating device is parallel to the axis of the winding shaft 42 of the first storage member 4. As shown in FIGS. 1 and 2, the rotating device includes a rotating block 3 disposed between the first storage member 4 and the fixing rod 2. The rotating block 3 is provided with a first pivot shaft 31 (as shown in FIG. 5), and the rotating block 3 and the first storage member 4 are pivotally connected by the first pivot shaft 31. Optionally, the rotating device may drive the fixing rod 2 to rotate by 360 degrees around the first storage member 4. Of course, the fixing rod 2 may rotate by 180 degrees or other degrees according to actual needs.

As shown in FIGS. 1 and 2, the storage member may further include a second storage member 5. The second storage member 5 is not connected to the rotating device. In the expansion direction of the flexible screen 1, the first end of the flexible screen 1 is connected to the first storage member 4, and the second end of the flexible screen 1 is connected to the second storage member 5. The second storage member 5 may be only connected to the second end of the flexible screen 1. When the flexible screen 1 is unwound or unfolded, the second end of the fixing rod 2 that is more remote from the rotating device than the first end may be abutted against the second storage member 5. The fixing rod 2 may be made of a rigid material. After the flexible screen 1 is accommodated in the first storage member 4, through the rotation of the rotating device, the second end of the fixing rod 2 may be detached from the second storage member 5. In this way, the detachable connection between the flexible screen 1 and the second end of the fixing rod 2, that is, the free end of the fixing rod 2 is implemented through the rotating device. In some embodiments, the second stored member 5 also has a winding shaft. When the flexible screen 1 needs to be wound, a part of the flexible screen 1 may be wound in the first storage member 4 and another part of the flexible screen 1 may be wound in the second storage member 5. With this configuration, force balance at the two sides of the flexible screen 1 is improved during the winding process or unwinding process, thereby avoiding deforming of the flexible screen 1 or the like. Optionally, in order to enable the second end of the fixing rod 2 remote from the rotating block 3 to be stably abutted with the second storage member 5, the second end of the fixing rod 2 has an abutting part 22 which is perpendicular to the extending direction of the fixing rod 2.

Figure 6:
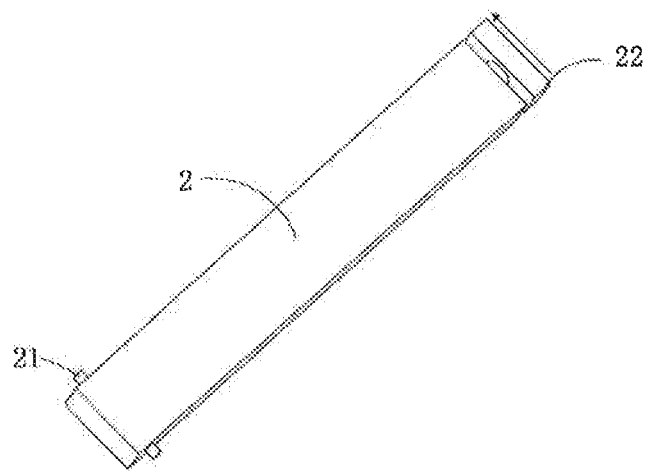
FIG. 6 is a schematic view of a fixing rod provided by an embodiment of the present disclosure.
Figure 7:
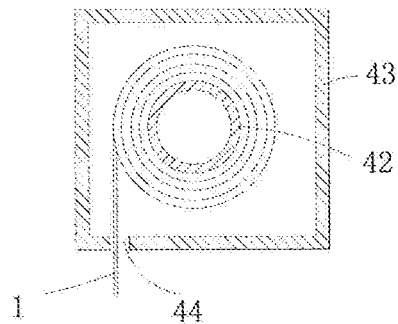
FIG. 7 is a sectional view of a storage member provided by an embodiment of the present disclosure.

Optionally, the flexible display device further includes a second pivot shaft 21. The second pivot shaft is disposed on the rotating block 3 or the fixing rod 2, and is perpendicular to the first pivot shaft 31. The fixing rod 2 is pivotally connected to the rotating block 3 through the second pivot shaft 21. FIG. 6 is a schematic view of an exemplary fixing rod according to an embodiment of the present disclosure. FIG. 7 is a sectional view of an exemplary storage member according to an embodiment of the present disclosure. As shown in FIG. 6, the second pivot shaft 21 is disposed on the fixing rod 2. When the flexible screen 1 is retracted into the first storage member 4, the flexible screen 1 does not need to be fixed. The fixing rod 2 may rotate about the axis of the rotating device by a certain angle, and then rotate about the axis of the second pivot shaft 21 towards the first storage member 4, such that the fixing rod 2 is finally parallel to the first storage member 4. Therefore, the volume of the flexible display device is reduced. In one or more embodiments, as shown in FIG. 2, the rotating block 3 has a recess 32, the second pivot shaft 21 is arranged in the recess 32, and the first end of the fixing rod 2 is secured with the second pivot shaft 21. Specifically, a first end of the second pivot shaft 21 is received in a hole at a first inner wall of the recess 32 and a second end of the second pivot shaft 21 is received in a hole at a second inner wall of the recess 32 opposite to the first inner wall. By disposing the recess 32 on the rotating block 3, a clearance space is provided for the rotation of the fixing rod 2 about the second pivot shaft 21, so that the fixing rod 2 will not collide with the rotating block 3 when the fixing rod 2 is rotated about the second pivot shaft 21.

FIG. 7 is a sectional view of an exemplary storage member provided by an embodiment of the present disclosure. As shown in FIG. 7, the first storage member 4 includes a housing 43 having an internal space for accommodating the flexible screen 1, such that the flexible screen 1 is protected from external impact or pollution. The winding shaft is disposed in the internal space of the housing 43, and the housing 43 has an opening 44, through which the flexible screen 1 is wound and unwound.

Optionally, the first storage member 4 may have a portion for receiving the fixing rod 2. As shown in FIG. 1, the first storage member 4 is further provided with a receiving groove 41 on the housing of the first storage member 4. The fixing rod 2 is received in the receiving groove 41 by rotating the fixing rod 2 about the second pivot shaft 21. With this arrangement, the fixing rod 2 has a first state (received state) in which the fixing rod 2 is received in the receiving groove 41 and a second state (fixing state) in which the fixing rod 2 is parallel to the expansion direction and fixes the flexible screen 1. The second state is mainly for preventing the flexible screen 1 form deforming. In one or more embodiments, the longitudinal direction of the receiving groove 41 is parallel to the axis of the winding shaft. The fixing rod 2 may be rotate, along with the rotation of the rotating device, to a position corresponding to the receiving groove 41. When the fixing rod 2 is at this position, the recess 32 faces the receiving groove 41 and is communicated with the receiving groove 41. Then, the fixing rod 2 is rotated about the second pivot shaft 21 into the receiving groove 41.

Figure 8:
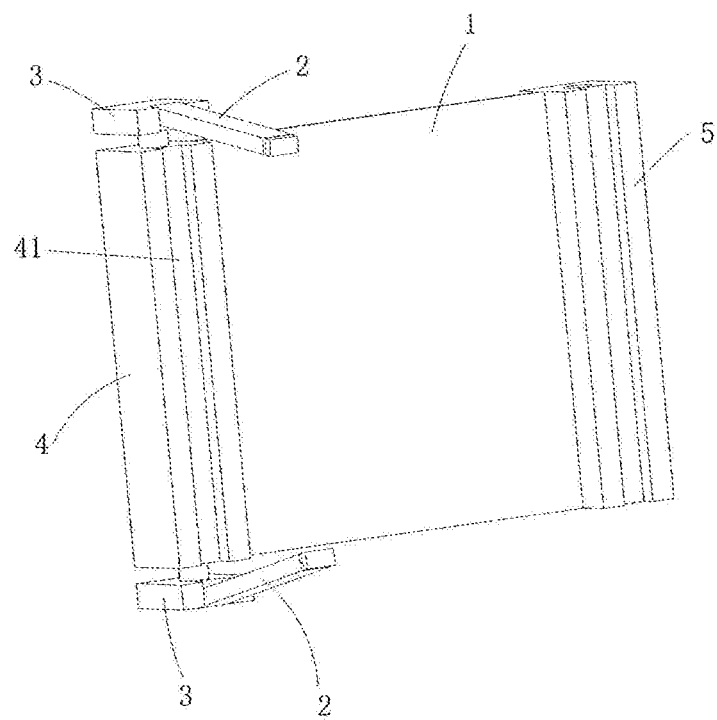
FIG. 8 is a schematic view of a third flexible display device provided by an embodiment of the present disclosure.
Figure 9:
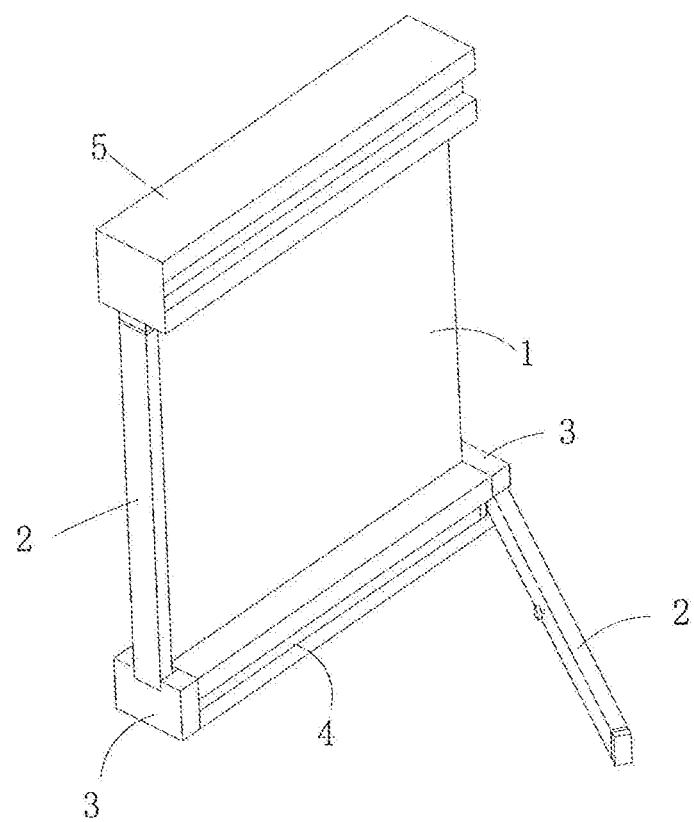
FIG. 9 is a schematic view of the third flexible display device having two fixing rods, one of which supports a flexible screen in an expanded state and the other one supports the flexible display device.

FIG. 8 is a schematic view of a third flexible display device provided by an embodiment of the present disclosure. As shown in FIG. 8, the third flexible display device includes two rotating devices (a first rotating device and a second rotating device) and two fixing rods (a first fixing rod and a second fixing rod). The first rotating device is arranged at a first end of the first storage member 4, and the second rotating device is arranged at a second end of the first storage member 4. The fixing rods 2 at the two ends of the first storage member 4 may both be rotated to the second state in which the two fixing rods 2 are parallel to the expansion direction of the flexible screen to fix the flexible screen 1, such that the flexible screen 1 does not deform. In other embodiments, one of the two fixing rods 2 is rotated to the second state to fix the flexible screen 1, and the other fixing rod 2 may be rotated to a position at which the fixing rod 2 is not parallel to the expansion direction of the flexible screen 1, that is, there is an included angle between the extending direction of the fixing rod 2 and the expansion direction of the flexible screen 1, this fixing rod 2 supports the flexible display device. In the embodiments in which the flexible display device has two fixing rods 2, as shown in FIG. 9, one of the two fixing rods 2 is in the fixing state, and the other fixing rod 2 is in a supporting state. In one or more embodiments, the two fixing rods 2 can be received in the receiving groove 41 of the first storage member 4 simultaneously. In an exemplary embodiment, the width of the receiving groove 41 is greater than a sum of the widths of the two fixing rods 2, such that the two fixing rods 2 can be received side by side. In another exemplary embodiment, the two fixing rods 2 are stacked in the receiving groove 41.

In one or more embodiments, the first storage member 4 has a cuboid shape, and preferably, the opening for winding the flexible screen 1 and unwinding the flexible screen 1 is disposed on the side surface of the cuboid first storage member in the longitudinal direction thereof, where the longitudinal direction of the first storage member 4 is parallel to the axial direction of the winding shaft. The first storage member 4 may be a housing having a cuboid shape, so that the flexible display device can be stably placed when the flexible screen 1 is accommodated. The receiving groove 41 for receiving the fixing rod 2 is provided on another longitudinal surface of the cuboid first storage member. In an exemplary embodiment, the receiving groove 41 is provided on a longitudinal surface of the cuboid first storage member parallel to the flexible screen 1. With such an arrangement, the rotation angle of the fixing rod 2 from the received state to the fixing state in which the fixing rod 2 fixes the flexible screen 1 is small, and the rotation angle is 90 degrees theoretically. If the receiving groove 41 is disposed on the longitudinal surface opposite to the opening, the fixing rod 2 needs to be rotated by 180 degrees from the received state to the fixing state. When the rotation angle is larger, the rotation of the fixing rod 2 needs more spaces. Optionally, a cross section of the rotating block 3 in the axial direction of the winding shaft and a cross section of the first storage member 4 in the axial direction of the winding shaft are the same square shape, and a central line of the first storage member 4 in a direction parallel to the axial direction of the winding shaft is coincident with a rotating central line of the rotating block 3. With such arrangement, when the rotating block 3 is rotated to drive the fixing rod 2 to rotate to the received state or the fixing state, the structure of the rotating block 3 relative to the end portion of the first storage member 4 is unchanged, the rotating block 3 may be substantially flush with the end portion of the first storage member 4 in the axial direction of the winding shaft, and therefore the flexible display device has an attractive appearance.

In another optional embodiment, the first storage member 4 is a cylindrical housing having an internal space, and the opening for winding or unwinding the flexible screen 1 and the receiving groove for receiving the fixing rod 2 are both disposed in the axial direction of the winding shaft, that is, both are arranged in the axial direction of the cylindrical housing. Specifically, the opening and the receiving groove 41 are parallel to each other and are spaced apart in the circumferential direction of the cylindrical housing. The distance between the opening and the receiving groove 41 is not limited in the present disclosure, as long as the rotation of the fixing rod 2 and the winding of the flexible screen 1 do not interfere with each other and the cylindrical housing provided with the opening and the receiving groove 41 has an adequate structural strength. The rotation angle of the fixing rod 2 from the received state to the fixing state may be less than 90 degrees with the above requirements being satisfied. In an alternative embodiment, the cross section of the rotating block 3 in the axial direction of the winding shaft and the cross section of the first storage member 4 in the axial direction of the winding shaft are the same circular shape.

Figure 10:
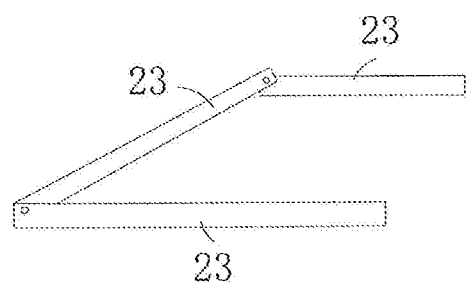
FIG. 10 is a schematic view of a foldable fixing rod provided by an embodiment of the present disclosure.
Figure 11:
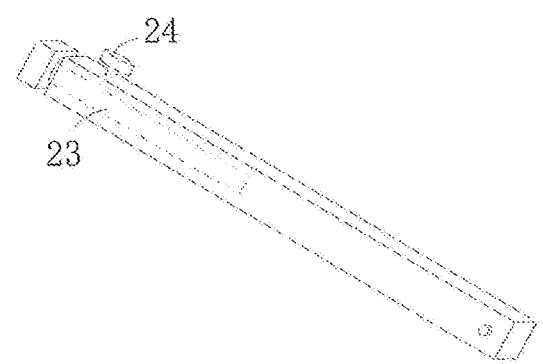
FIG. 11 is a schematic view of a retractable fixing rod provided by an embodiment of the present disclosure.
Figure 12:
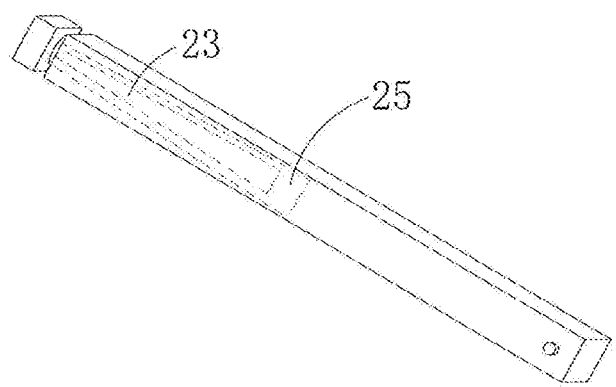
FIG. 12 is a schematic view of another retractable fixing rod provided by an embodiment of the present disclosure.

In addition, in order to improve user experience, the length of the flexible screen 1 in its expansion direction is usually longer. In order to enable the fixing rod 2 in the fixing state to fix the unwound flexible screen 1, the fixing rod 2 may be a retractable rod or a foldable rod. The retractable rod or the foldable rod has different working lengths, so that the retractable rod or the foldable rod is adaptable to different expansion lengths of the flexible screen. Furthermore, the retractable rod or the foldable rod needs less space when being received. FIG. 10 is a schematic view of an exemplary foldable fixing rod 2 provided by the embodiment of the present disclosure. As shown in FIG. 10, the fixing rod 2 may include a plurality of sub-rods 23 connected to one another, and two adjacent sub-rods 23 are pivotally connected by a third pivot shaft, In another exemplary embodiment, the fixing rod 2 is a retractable rod, and the retractable rod includes at least two sub rods 23 that are sleeved with one another. A front end of the outer sub rod is provided with an opening, and the sub rod 23 inside this sub rod may extend out from the opening. Specifically, as shown in FIG. 11, the fixing rod 2 includes two sub-rods 23 including an outer sub-rod and an inner sub-rod arranged in the internal space of the outer sub-rod. The outer sub-rod 23 is provided with a threaded adjusting rod 24 on a side wall of the outer sub-rod 23, and the threaded adjusting rod 24 is capable of extending into the internal space of the outer sub-rod 23. The inner sub-rod 23 is provided with at least two threaded holes (not shown in the drawings) which are arranged along the axis line of the inner sub-rod. When the threaded adjusting rod 24 is screwed with one of the at least two threaded holes on the inner sub-rod, the fixing rod 2 may maintain an extended state, and when the threaded adjusting rod 24 is screwed with another one of the at least two threaded holes, the fixing rod 2 may maintain the retracted state. In some embodiments, in order to achieve multi-stage adjustment of the fixing rod 2, the inner sub-rod 23 may be provided with a plurality of threaded holes along the axis line of the inner sub-rod 23. With the plurality of threaded holes, the fixing rod 2 may have different lengths. Which threaded hole is connected to the threaded adjusting rod 24 is determined according to the expansion lengths of the flexible screen 1, so that the fixing rod 2 can have different lengths in its longitudinal direction, and the expanded flexible screen 1 does not deform, and the user experience is improved. In addition, the threaded adjusting rod may be connected to the threaded hole which firstly extends out of the outer sub rod after the flexible screen 1 is wound, thereby reducing the space occupied by the fixing rod 2 when the fixing rod 2 is received, in one or more embodiments, as shown in FIG. 12, the outer one of any two adjacent sub rods 23 of the retractable fixing rod 2, i.e., the outer sub rod, has a tapered channel 25 extending in the axial direction of the outer sub rod from the front end to the rear end of the outer sub rod, and an aperture of the tapered channel 25 is reduced from the rear to the front. When the inner sub-rod extends out of the outer sub-rod, one end, still in the tapered channel 25, of the inner sub rod 23 is in interference fit with the inner wall of the tapered channel 25. In other embodiments, the fixing rod 2 may have other types of retractable structures or foldable structures, which will not be listed here.

As shown in FIGS. 13 to 18, in the flexible display device provided by the embodiments of the present disclosure, optically, each of the two ends of the flexible screen 1 in its expansion direction is provided with the first storage member 4 connected to the rotating device.

Figure 13:
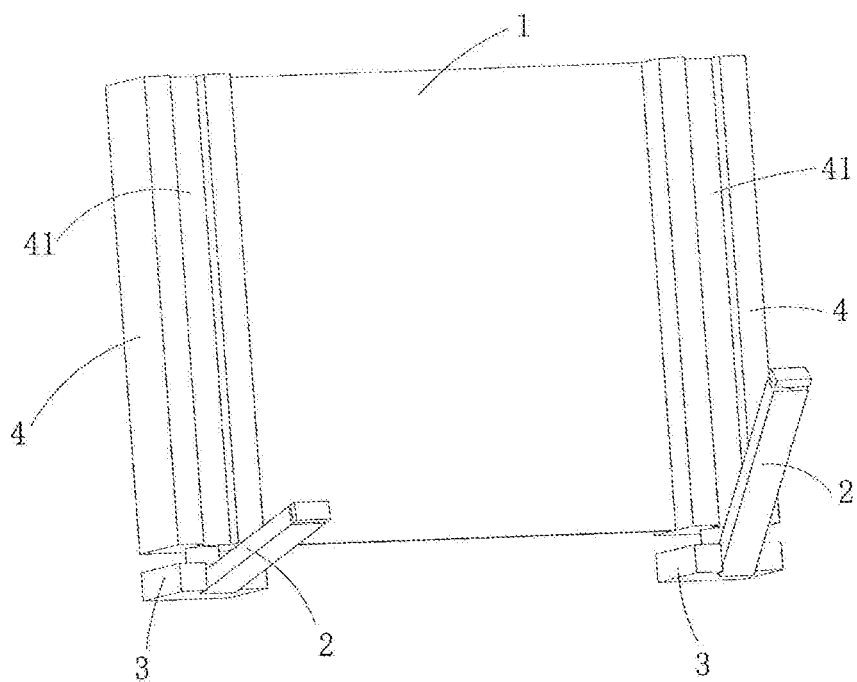
FIG. 13 is a schematic view of a fourth flexible display device provided by an embodiment of the present disclosure.
Figure 14:
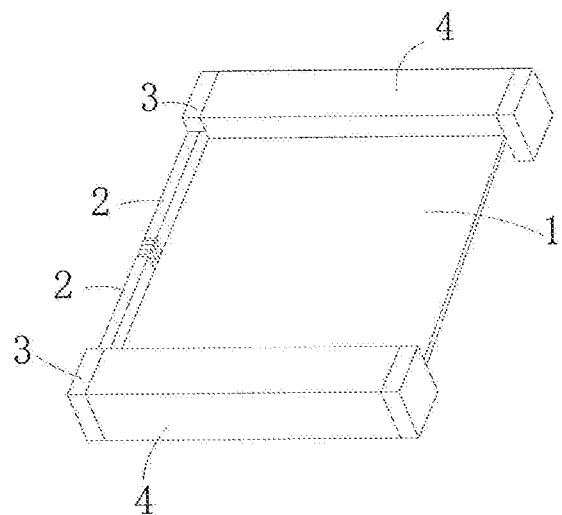
FIG. 14 is a schematic view of the fourth flexible display device in which two fixing rods support an expanded flexible screen provided by an embodiment of the present disclosure.

FIG. 13 is a schematic 1 view of a fourth flexible display device provided by the embodiment of the present disclosure. As shown in FIG. 13, each of the two ends of the flexible screen 1 is provided with first storage members 4, and each first storage members 4 is provided with one rotating device and one fixing rod 2. The rotating devices and the fixing rods 2 are disposed on the same side of the two first storage members 4. When the flexible screen 1 is expanded, the rotation of the rotating device of the first storage member 4 may rotate the fixing rod 2 to the position at which the fixing rod 2 is parallel to the expansion direction of the flexible screen 1 so as to fix the flexible screen 1, such that the flexible screen 1 is flat. In some embodiments, one of the rotating devices drives the fixing rod 2 to rotate to the fixing state in which the corresponding fixing rod 2 is parallel to the expansion direction of the flexible screen 1 so as to make the flexible screen 1 flat, and the other rotating device may drive the fixing rod 2 to rotate to the supporting state in which the corresponding fixing rod 2 is not parallel to the expansion direction of the flexible screen 1 so as to support the flexible display device. Of course, as shown in FIG. 14, when the two rotating devices drive the fixing rods 2 to rotate to the state where both the fixing rods 2 are parallel to the expansion direction of the flexible screen 1, the expanded flexible screen 1 has the largest length.

When the rotating devices and the fixing rods 2 are disposed on different sides of the two first storage members 4, the expanded length of the flexible screen 1 may only depend on the length of one of the fixing rods 2.

Figure 15:
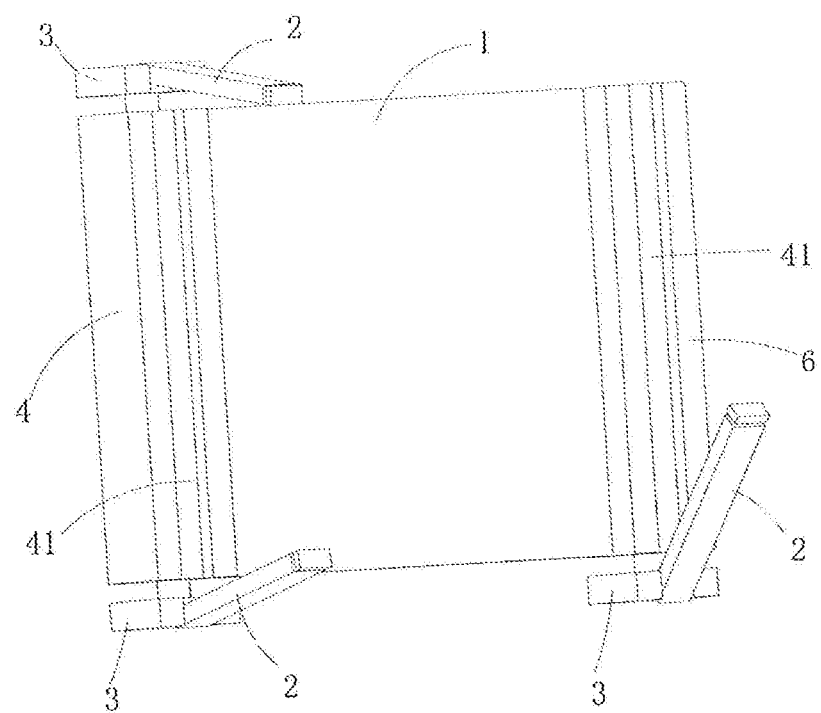
FIG. 15 is a schematic view of a fifth flexible display device provided by an embodiment of the present disclosure.

FIG. 15 is a schematic view of a fifth flexible display device provided by the embodiment of the present disclosure. As shown in FIG. 15, the fifth flexible display device includes a flexible screen 1, a first storage member 4 at a first end of the flexible screen 1 and a second storage member 6 at the second end of the flexible screen 1. The first storage member 4 has a first end and a second end, each of which is provided with a rotating device and a fixing rod 2. The second storage member 6 has a first end and a second, and only the first end is provided with a rotating device and a fixing rod 2. With such arrangement, the flexible screen 1 in the flexible display device can be unwound to its largest expansion length, and the fixing rod 2 at the second end of the first storage member 4 can serve as a support rod to support the entire flexible display device.

Figure 16:
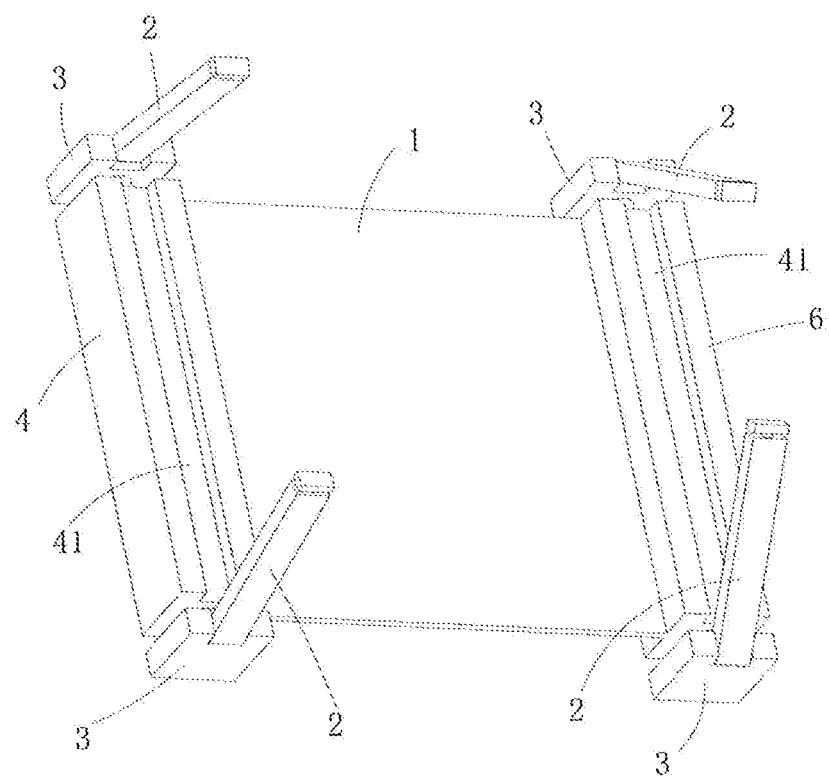
FIG. 16 is a schematic view of a sixth flexible display device provided by an embodiment of the present disclosure.

FIG. 16 is a schematic view of a sixth flexible display device provided by the embodiment of the present disclosure. As shown in FIG. 16, the sixth flexible display device includes a flexible screen 1, a first storage member 4 at a first end of the flexible screen 1 and a second storage member 6 at the second end of the flexible screen 1. The first storage member 4 has a first end and a second end, each of which is provided with a rotating device and a fixing rod 2. The second storage member 6 has a first end and a second end, each of which is provided with a rotating device and a fixing rod 2. With the above configuration, these fixing rods 2 have multiple manners of operation.

Figure 17:
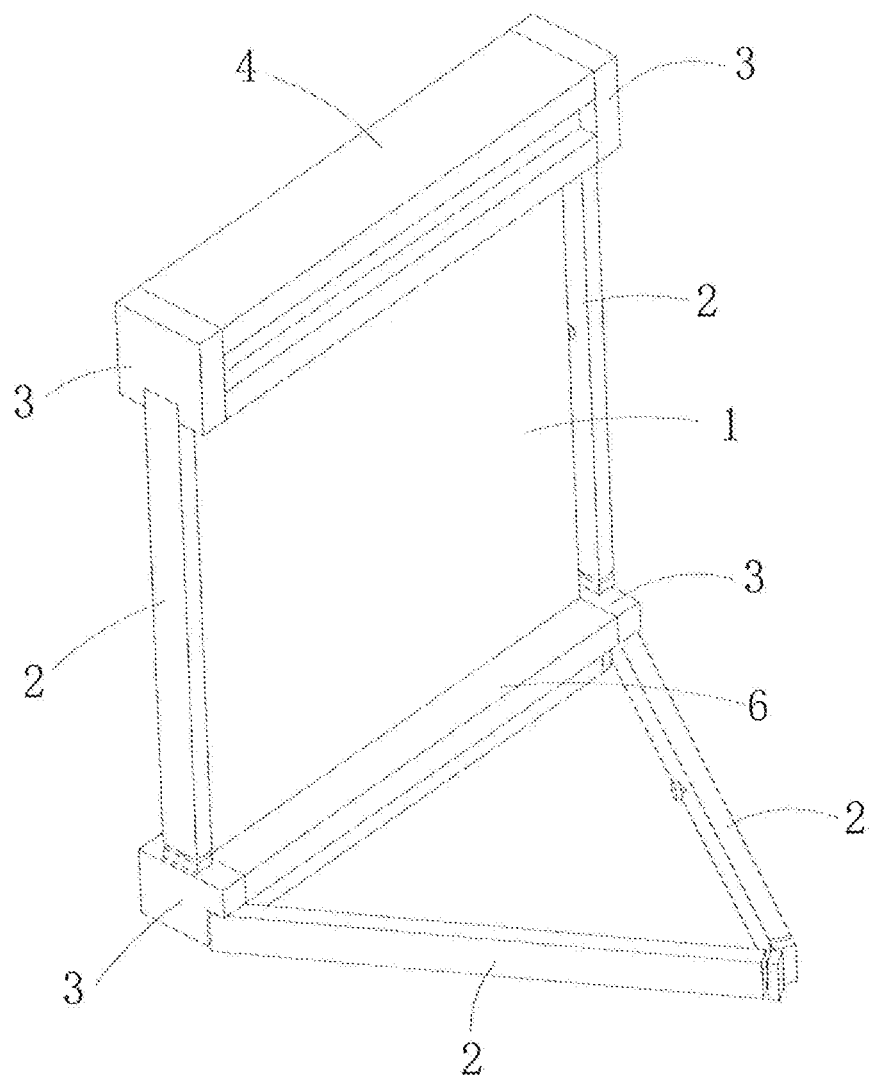
FIG. 17 is a schematic view of the sixth flexible display device in which a fixing rod is in a first state provided by an embodiment of the present disclosure.

For example, the fixing rods 2 of the first storage member 4 are all rotated to be parallel to the expansion direction of the flexible screen 1, and the flexible screen 1 is fixed by the two fixing rods 2 from two sides, and the fixing rods 2 of the second storage member 6 support the entire flexible display device. For another example, as shown in FIG. 17, the two fixing rods 2 for supporting the flexible display device may rotate about the second pivot shaft 21, and the two fixing rods 2 are not parallel, such that the flexible display device is more stable. Preferably, the second ends of the two fixing rods 2 may be abutted against each other, so that the two fixing rods 2 and the first storage member 4 form a triangle, thereby providing a stable support for the entire flexible device.

Figure 18:
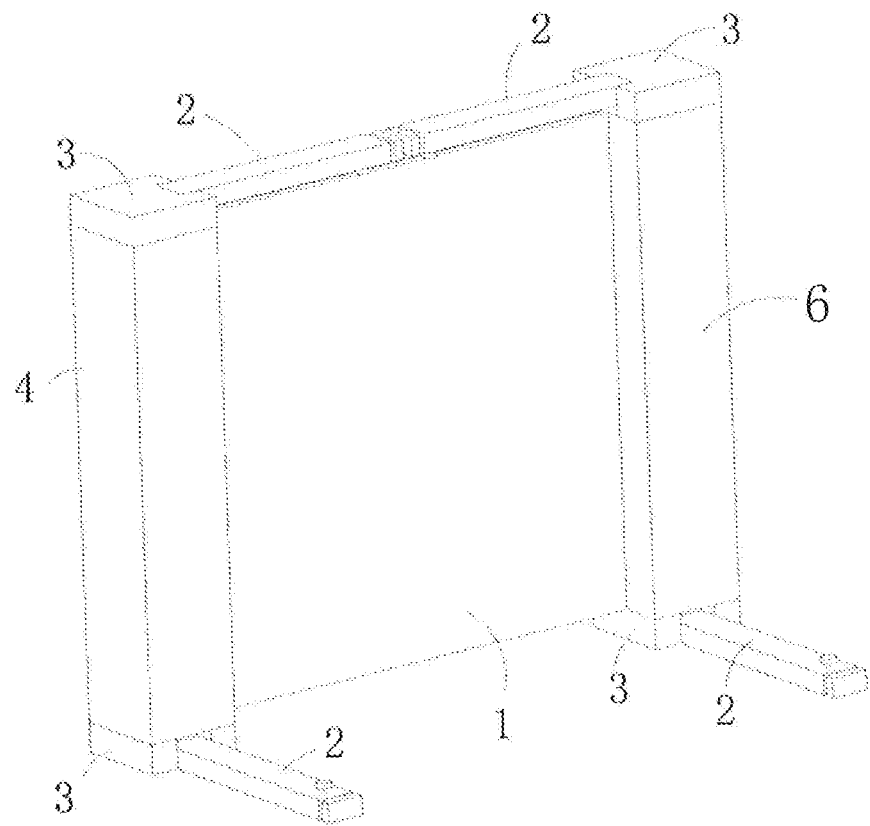
FIG. 18 is a schematic view of the sixth flexible display device in which a fixing rod is in a second state provided by an embodiment of the present disclosure.

In another embodiment, as shown in FIG. 18, the fixing rod 2 at the first side of the first storage member 4 and the fixing rod 2 at the first side of the second storage member 6 are both rotated to be parallel to the expansion direction of the flexible screen 1, such that the flexible screen 1 is fixed by the two fixing rods 2, and the fixing rod 2 at the second side of the first-storage member 4 and the fixing rod 2 at the second side of the second storage member 6 are rotated, such that the two fixing rods 2 are not parallel to the expansion direction of the flexible screen 1, that is, each of the two fixing rods 2 is inclined by certain angle with respected to the expansion direction of the flexible screen 1, and the flexible display device is stable. This arrangement enables the flexible screen 1 to be longest in its expansion direction.

Of course, the fixing rods 2 in the flexible display device also have other arrangements, which are not listed here.

In the above arrangements, the second end of the fixing rod 2 should be stably abutted against another fixing rod 2, or be stably abutted against the rotating block 3 of the other storage member. In some embodiments, the second end of the fixing rod 2 is provided with an abutting part 22 protruding in a direction (as shown by an arrow in FIG. 6) perpendicular to the extending direction (longitudinal direction) of the fixing rod 2. In an exemplary embodiment, the abutting portion 22 is a magnetic member, and the magnetic members of the fixing rods 2 at the same side of the flexible screen 1 have the opposite magnetic poles. By disposing a magnetic member at the second end of the fixing rod 2, the detachable connection between the fixing rod 2 and another rotating device and the detachable connection between the fixing rod 2 and another fixing rod 2 can be achieved while ensuring the connection stability.

The flexible display device in the present disclosure includes: a flexible screen which may be curved and folded, for example, a flexible OLED display screen, a flexible LCD screen, flexible electronic paper and the like. The flexible display device further includes the storage member for accommodating the flexible screen and the fixing rod for supporting and fixing the expanded flexible screen. The flexible display device may be used as a monitor for a portable computer, a conference display screen, an advertising display panel and the like.

It is to be noted that the above-mentioned contents are only the exemplary embodiments of the present disclosure and the technical principles applied thereto. It is to be understood by those skilled in the art that the present disclosure is not limited to the particular embodiments described herein, and that various variations, rearrangements and substitutions may be made without departing from the protection scope of the present disclosure. Therefore, although the present disclosure has been described in detail with reference to the above embodiments, the present disclosure is not limited to the above embodiments, and may further include other equivalent embodiments without departing from the concept of the present disclosure, and the scope of the present disclosure is defined by the appended claims.

What is claimed is:

1. A flexible display device, comprising:
    a flexible screen; and
    a fixing rod, which is connected to the flexible screen through a rotating device, wherein the fixing rod has a first end and a second end, wherein the fixing rod is capable of rotating to a position in which the fixing rod is parallel to an expansion direction of the flexible screen, and the second end of the fixing rod is detachably connected to the flexible screen,
    wherein at least one end of the flexible screen in the expansion direction of the flexible screen is provided with a first storage member, the first storage member comprises a winding shaft connected to the flexible screen, the first storage member is connected to the rotating device in an axial direction of the winding shaft, and the rotating device is immoveable relative to the first storage member in the axial direction of the winding shaft; and
    wherein the rotating device comprises a rotating block disposed between the first storage member and the fixing rod, the rotating block is pivotally connected to the first storage memeber through a first pivot shaft, the fixing rod is pivotally connected to the rotating block through a second pivot shaft, and the first pivot shaft is perpendicular to the second pivot shaft.

2. The flexible display device of claim 1, wherein the rotating device is connected to an end of the flexible screen, and the first end of the fixing rod is connected to the rotating device.

3. The flexible display device of claim 1, wherein the first storage member further comprises a receiving groove, and the fixing rod is capable of being received in the receiving groove by the rotating device.

4. The flexible display device of claim 3, wherein the first storage member has a cuboid shape, and a first longitudinal surface of the cuboid-shaped first storage member is provided with an opening for winding or unwinding the flexible screen, and the receiving groove is arranged on a second longitudinal surface of the cuboid-shaped first storage member which is parallel to the flexible screen.

5. The flexible display device of claim 1, wherein the rotating block is provided with a recess, and the first end of the fixing rod extends into the recess so as to be pivotally connected to the rotating block.

6. The flexible display device of claim 1, wherein the fixing rod has a fixing state in which the fixing rod is parallel to the expansion direction of the flexible screen and a supporting state in which the fixing rod is not parallel to the expansion direction of the flexible screen.

7. The flexible display device according to claim 6, wherein two first storage members are provided, and each of the two first storage members is located on a respective one of two ends of the flexible screen in the expansion direction of the flexible screen and has a first end and a second end in the axial direction of the winding shaft; four rotating devices and four fixing rods are provided; and each of the first end and the second end is provided with a respective one of the four rotating devices and respective one of the four fixing rods.

8. The flexible display device of claim 6, wherein two first storage members are provided, and each of the two first storage members is located on a respective one of two ends of the flexible screen in the expansion direction of the flexible screen; two fixing rods are located on a same side of the flexible screen in a direction perpendicular to the expansion direction of the flexible screen, the second end of the of the two fixing rods has an abutting part protruding in a direction perpendicular to an extending direction of the fixing rod, and the abutting part is configured to abut against the fixing rod or the rotating device of the other one of the two first storage members.

9. The flexible display device of claim 8, wherein the abutting part is a magnetic member, and the magnetic members of the two fixing rods have opposite magnetic poles.

10. The flexible display device of claim 1, wherein a cross section of the rotating block in the axial direction of the winding shaft and a cross section of the first storage member in the axial direction of the winding shaft are a same square shape, and a center line of the first storage member in a direction parallel to the axial direction of the winding shaft is coincident with a rotation center line of the rotating block.

11. The flexible display device of claim 1, wherein the fixing rod is a retractable rod or a foldable rod.

12. The flexible display device of claim 11, wherein the fixing rod is a retractable rod, the retractable rod comprises at least two sub-rods, and adjacent sub-rods of the at least two sub-rods are sleeved with one another, wherein a front end of an outer one of the adjacent sub-rods is provided with an opening, and an inner one of the adjacent sub-rods is capable of extending out from the outer one via the opening at the front end of the outer one.

13. The flexible display device of claim 12, wherein a side wall of the outer one is provided with a threaded adjusting rod capable of extending into an internal space of the outer one, and wherein the inner one is provided with at least two threaded holes arranged along an axial direction of the inner one, and the threaded adjusting rod is capable of being connected to any one of the at least two threaded holes.

14. The flexible display device of claim 12, wherein the outer one has a tapered channel extending in an axial direction from a rear end to a front end, and an aperture of the tapered channel is reduced from the rear end to the front end, and wherein when the adjacent sub-rods are in a stretched state, a rear end of the inner one is in interference fit with an inner wall of the tapered channel.

* * * * *